US010459102B2

(12) United States Patent
Walker

(10) Patent No.: US 10,459,102 B2
(45) Date of Patent: Oct. 29, 2019

(54) SIGNAL DETECTION IN SEMBLANCE METHODS

(71) Applicant: Halliburton Energy Services, Inc, Houston, TX (US)

(72) Inventor: Kristoffer Thomas Walker, Kingwood, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 151 days.

(21) Appl. No.: 15/313,824

(22) PCT Filed: Jan. 29, 2016

(86) PCT No.: PCT/US2016/015553
§ 371 (c)(1),
(2) Date: Nov. 23, 2016

(87) PCT Pub. No.: WO2016/123436
PCT Pub. Date: Aug. 4, 2016

(65) Prior Publication Data

US 2017/0184752 A1 Jun. 29, 2017

Related U.S. Application Data

(60) Provisional application No. 62/110,397, filed on Jan. 30, 2015.

(51) Int. Cl.

| | |
|---|---|
| ***G01V 1/00*** | (2006.01) |
| ***G01V 1/50*** | (2006.01) |
| ***E21B 47/00*** | (2012.01) |
| ***G01V 1/30*** | (2006.01) |

(52) U.S. Cl.
CPC ................ *G01V 1/50* (2013.01); *E21B 47/00* (2013.01); *G01V 1/303* (2013.01)

(58) Field of Classification Search
CPC ........... G01V 1/50; G01V 1/303; E21B 47/00
See application file for complete search history.

(56) References Cited

U.S. PATENT DOCUMENTS

| | | | |
|---|---|---|---|
| 4,168,483 | A | 9/1979 | Parthasarathy et al. |
| 4,210,966 | A | 7/1980 | Ingram |
| 4,594,691 | A | 6/1986 | Kimball et al. |
| 4,683,556 | A | 7/1987 | Willis |
| 5,077,697 | A | 12/1991 | Chang |

(Continued)

FOREIGN PATENT DOCUMENTS

| | | | |
|---|---|---|---|
| WO | WO 2000/060380 | A1 | 10/2000 |
| WO | WO 2014/070182 | A1 | 5/2014 |

OTHER PUBLICATIONS

International Search Report and the Written Opinion of the International Search Authority, or the Declaration, dated May 27, 2016, PCT/US2016/015553, 15 pages, ISA/KR.

(Continued)

*Primary Examiner* — Krystine E Breier
(74) *Attorney, Agent, or Firm* — Haynes and Boone, LLP

(57) ABSTRACT

Disclosed herein is an approach to processing the waveforms measured by a plurality of receivers in a manner that improves signal-detection performance for multiple simultaneously occurring signals, despite disparate signal and noise levels, by applying an waveform pre-processing scheme prior to computing a semblance map therefrom.

19 Claims, 11 Drawing Sheets

(56) References Cited

U.S. PATENT DOCUMENTS

| | | | | |
|---|---|---|---|---|
| 5,278,805 | A | 1/1994 | Kimball | |
| 6,868,341 | B2 * | 3/2005 | Valero | G01V 1/366 702/11 |
| 7,423,930 | B2 * | 9/2008 | Valero | G01V 1/48 367/28 |
| 7,646,673 | B2 * | 1/2010 | Akhmetsafin | G01V 1/48 367/24 |
| 7,698,066 | B2 * | 4/2010 | Huang | G01V 1/48 702/14 |
| 9,523,784 | B2 * | 12/2016 | Orban | G01V 1/40 |
| 9,605,536 | B2 * | 3/2017 | Mickael | E21B 47/14 |
| 2005/0251342 | A1 | 11/2005 | Market et al. | |
| 2006/0039238 | A1 | 2/2006 | Mandal et al. | |
| 2009/0005995 | A1 | 1/2009 | Tang et al. | |
| 2009/0037111 | A1 | 2/2009 | Radtke et al. | |
| 2009/0067286 | A1 | 3/2009 | Bose et al. | |
| 2010/0177594 | A1 | 7/2010 | Bose et al. | |
| 2014/0169130 | A1 * | 6/2014 | Aeron | G06F 17/148 367/31 |
| 2014/0365133 | A1 | 12/2014 | Elkington et al. | |
| 2016/0320508 | A1 * | 11/2016 | Peng | G01V 1/36 |
| 2017/0102475 | A1 * | 4/2017 | Mukhopadhyay | G01V 1/48 |

OTHER PUBLICATIONS

Mukhopadhyay, et al., "Improved Resolution of Time- and Frequency-Based Coherence Processing of Acoustic Array Data Using Differential Phase," *SPWLA Annual Logging Symposium*, Jun. 22-26, 2013.

Mukhopadhyay, et al., "The Differential-Phase Based Time- and Frequency-Semblance Algorithm for Array-Acoustic Processing and Its Application To Formation-Slowness Measurement," *Petrophysics*, Oct. 1, 2013, pp. 475-481, vol. No. 54. Issue No. 5, Society of Petrophysicists and Well-Log Analysis.

Search Report issued for European Patent Application No. 16 74 4159, dated Jul. 2, 2018, 6 pages.

* cited by examiner

SIGNAL DETECTION IN SEMBLANCE METHODS

CLAIM FOR PRIORITY

The present application is a U.S. National Stage patent application of International Patent Application No. PCT/US2016/015553, filed on Jan. 29, 2016, which claims priority to and the benefit of U.S. Provisional Application No. 62/110,397, filed on Jan. 30, 2015, both of which are hereby incorporated herein by reference in their entirety.

BACKGROUND

Acoustic logs are routinely used in the oil and gas industry to characterize the formation around a borehole, e.g., by identifying various types of lithology (such as shale or sandstone), detecting the presence of hydrocarbons, or measuring certain geophysical properties such as stress or permeability. To acquire an acoustic log, a sonic logging tool with one or more acoustic sources and multiple receivers may be run through the borehole (e.g., on a wireline or as part of a bottom hole assembly of a drill string) to excite acoustic waves in the formation and measure the formation response with the receivers at various depths along the borehole. For each depth, the acoustic waveforms acquired by the various receivers may be processed with a semblance (or, as it is also often referred to, beamforming) method to compute a two-dimensional (e.g., time-slowness or frequency-slowness) semblance map that generally exhibits peaks corresponding to the arrivals of various types of acoustic waves (such as compressional, refracted-shear, and Stoneley waves) travelling at different apparent velocities. The identified peaks may be aggregated across depths to obtain, for each type of wave, a log of the wave velocity or slowness (which is the inverse of the velocity) as a function of depth within the borehole.

While a sole signal peak in a semblance map can usually be easily detected based on an associated maximum value of the semblance function, the simultaneous detection and identification of multiple signal peaks can be more challenging. Coherence-based semblance methods can be very sensitive, but accidentally "detect" signals that are not real. In such cases, the fake alarm of detecting these "signals" is due simply to a random occurrence of energy crossing the receiver array that happens to be "coherent enough" to be detected. Consequently, coherence-based methods often need additional constraints, based on physics, to separate out real detections from false alarms. Conversely, amplitude-based semblance methods are more robust, but are prone to false negatives, i.e., the failure to detect a real signal. Missed detections are often due to signal-amplitude levels too small compared with some reference amplitude level, such as, e.g., the highest signal amplitude within the semblance map, upon which the threshold amplitude for signal detection may be based. The problem often arises when trying to simultaneously detect multiple signals with widely varying amplitudes. In acoustic borehole data, for example, the signal peak associated with the arrival of the compressional wave is sometimes orders of magnitudes lower than that of the Stoneley wave, rendering the selection of a suitable detection threshold difficult, especially when the noise levels change from one borehole depth to the next. Accordingly, improved methods for the simultaneous detection of multiple signals in semblance maps, with low rates of both false positives and false negatives, are desirable.

DETAILED DESCRIPTION

Disclosed herein is an approach to processing the waveforms measured by a plurality of receivers in a manner that improves signal-detection accuracy for the case where multiple simultaneously occurring signals are sought, despite disparate signal levels, by applying an amplitude regularization scheme to the waveforms prior to computing an amplitude semblance map therefrom. The amplitude regularization serves to cause signals of varying amplitudes as well as all the noise to converge towards the same amplitude level. Subsequent averaging of the regularized waveforms across the various receivers (with suitable relative time delays to cause constructive interference of the signals) reduces the noise level relative to the signal level in a predictable manner following coherent averaging theory (due to destructive interference of the former). Such waveform averaging may be inherently accomplished with an amplitude-based semblance method. The local maximum values in the resulting amplitude semblance map that are above the theoretical threshold defined by coherent averaging theory are therefore associated with real signals. In some embodiments, instead of being used directly, the peaks identified in the amplitude semblance map are associated with, and serve as checks for, peaks detected in a coherence semblance map computed from the same waveforms, which may serve to reduce the number of possible detections derived from coherence-based signal detection methods.

The semblance-based signal detection method disclosed herein, while discussed below largely with reference to the example of acoustic waves, is generally applicable to the simultaneous detection of multiple coherent waves (of any type) propagating across a plurality of receivers, and may find applications in fields like seismology, electromagnetics, or any array processing method that seeks to separate signals from noise where multiple signals are to be detected simultaneously.

Figure 1A:
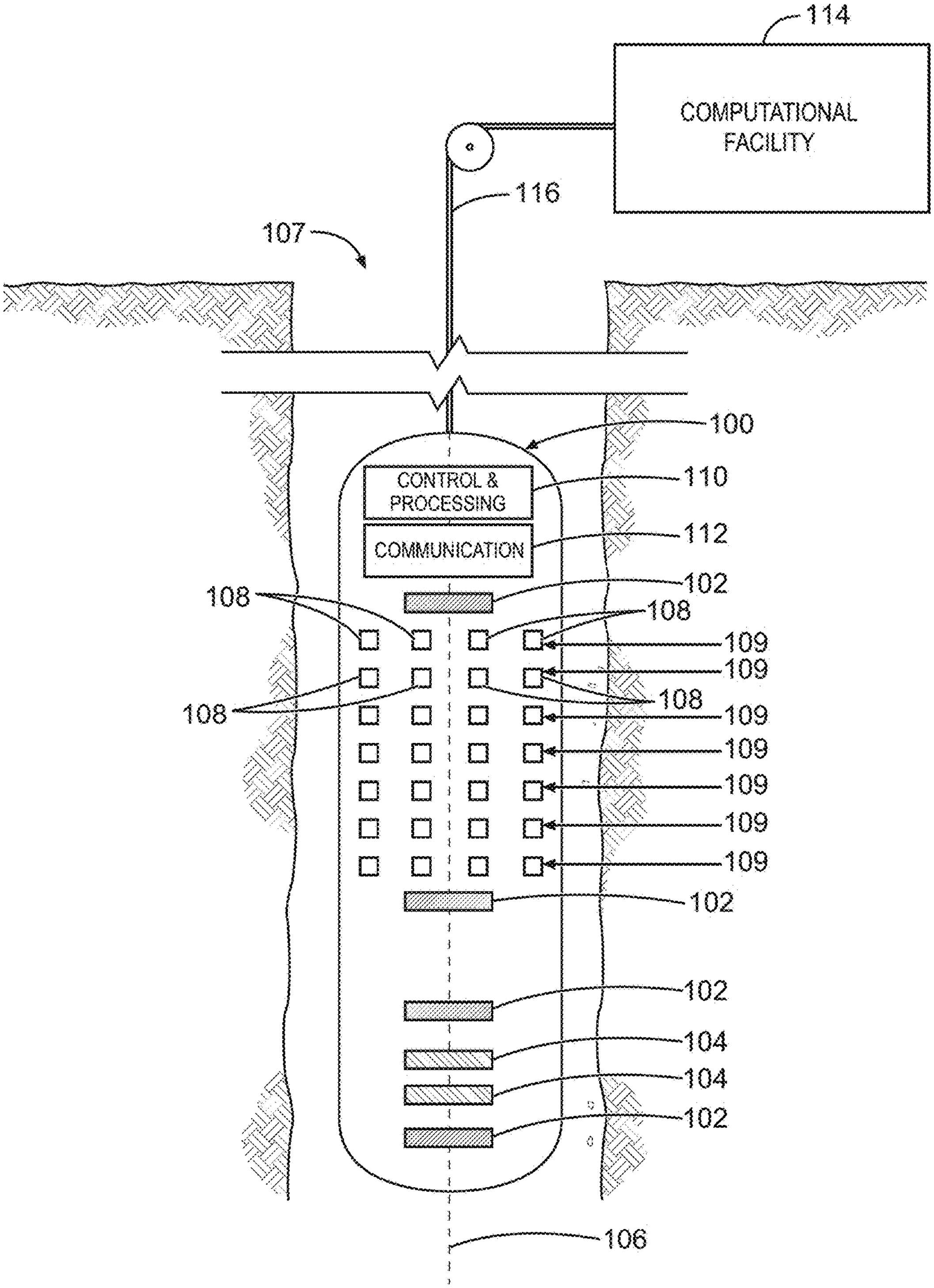
FIG. 1A is a schematic drawing of a sonic logging tool deployed in a borehole in a wireline operation, in accordance with various embodiments.
Figure 1B:
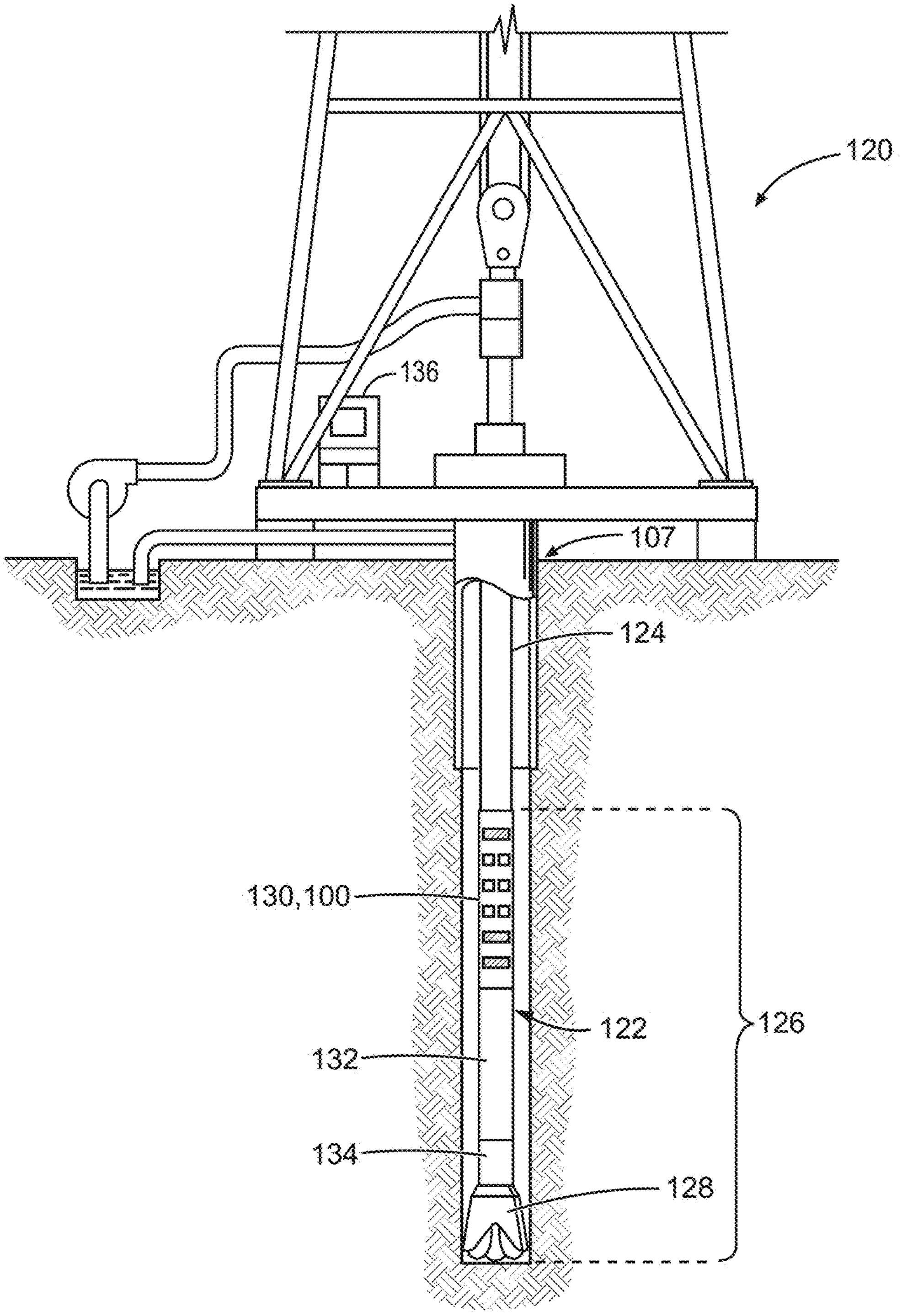
FIG. 1B is a schematic drawing of a sonic logging tool deployed in a borehole in a logging-while-drilling (LWD) operation, in accordance with various embodiments.

To provide some context for semblance methods, an example sonic logging tool in accordance with various embodiments will now be described. FIGS. 1A and 1B show the sonic logging tool 100 deployed in a borehole in wireline and LWD operations, respectively. With reference to FIG. 1A, the sonic logging tool 100 may include multiple acoustic sources 102, 104 arranged at various positions along the longitudinal tool axis 106 (which, when the tool 100 is deployed in a borehole 107, generally coincides with the borehole axis). The acoustic sources may include both monopole sources 102 that emit acoustic waves omnidirectionally, as well as dipole or quadrupole sources 104 that emit directional acoustic waves. The sonic logging tool 100 further includes a plurality of acoustic receivers 108 at various positions along the longitudinal axis, arranged, for example, in an array having multiple rings 109 at the different longitudinal positions, where each ring may include multiple receivers 108 distributed azimuthally around the tool axis 106. For example, in one embodiment, the tool 100 includes thirteen rings 109 of receivers 108 and eight receivers 108 per ring 109 (not all depicted). As will be readily appreciated by those of ordinary skill in the art, different receiver rings generally receive acoustic waves resulting from an emission by one of the acoustic sources 102, 104 with different time delays, due to their varying distances from the source 102 or 104, facilitating the application of semblance/beamforming methods to ascertain the acoustic wave velocity from the measured waves.

The tool 100 may further include control-and-processing circuitry 110 for controlling the operation of the sources 102, 104 and receivers 108 and processing the receiver measurements, as well as a communications module 112 for exchanging data and/or control signals with a surface computational facility 114 via a wired or wireless connection. In general, the functionality for controlling the tool operation and processing the data can be distributed in various ways between the control-and-processing circuitry 110 integrated into the tool 100 and the computational facility 114 located above surface. For example, raw data (e.g., acoustic waveforms) acquired by the receivers 108 may be sent directly to the surface computational facility 114 for processing thereat, or may alternatively be processed by the circuitry 110 to obtain derived data (e.g., computed wave velocities) that are then communicated to the surface. Both the control-and-processing circuitry 110 and the surface computational facility 114 may be implemented with any suitable combination of hardware, firmware, and software, such as, for example, with dedicated electronic circuitry and/or suitably programmed general-purpose or special-purpose computers.

The sonic logging tool 100 may be operated periodically, i.e. in cycles, as the tool is run through (i.e., lowered into or pulled out of) the borehole 107, e.g., on a wireline 116, as shown in FIG. 1A, to acquire acoustic measurements at various depths along the way. (Alternative means of conveyance include, e.g., slickline or coiled tubing.) Within each cycle of operation (corresponding to a certain depth within the borehole), the various acoustic sources 102, 104 may be fired sequentially, at intervals sufficiently large to separate out the formation responses to the various firings in the acoustic waves measured at the receivers 108.

Turning now to FIG. 1B, the example logging tool 100 is shown implemented in a drilling system during an LWD operation. The drilling system includes a drilling rig 120 located at the surface and, supported by the drilling rig 120, a drill string 122 for drilling the borehole 107 through the subsurface formations. The drill string 122 includes a drill pipe 124 and, generally located at the lower end of the drill pipe 124, a bottom hole assembly (BHA) 126. The BHA 126 may include the drill bit 128 and, disposed thereabove, one or more drill collars 130, 132, 134, which may contain a number of different tools and instruments adapted for taking measurements during the drilling process. In accordance with various embodiments, these tools may include a sonic logging tool 100 (depicted schematically within collar 130) with multiple acoustic sources 102, 104 and acoustic receivers 108 as well as associated control-and-processing circuitry 110 and a communications module 112 (not all details shown). The tool 100 may be in communication with a surface computational facility 136 implemented with a suitable combination of hardware, firmware, and software, such as (e.g., a suitably programmed general-purpose computer). Similarly to wireline embodiments, the functionality for controlling the tool operation and processing the data can be distributed in various ways between the control-and-processing circuitry 110 integrated into the tool 100 and the computational facility 136 located above surface.

Figure 2:
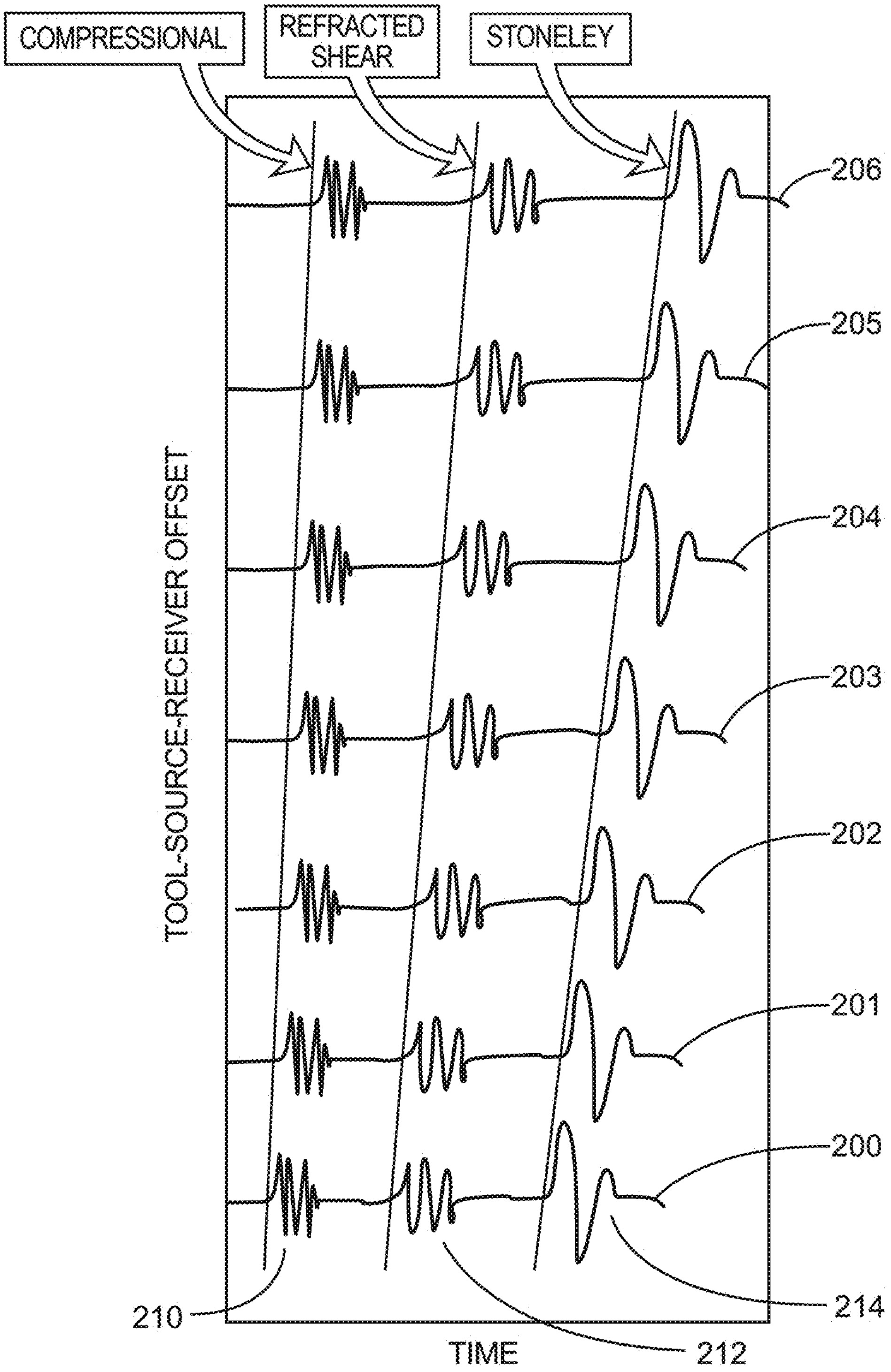
FIG. 2 is a schematic drawing showing hypothetical acoustic waveforms measured, in accordance with various embodiments, with seven receivers placed at different distances from the acoustic source, each waveform reflecting the arrival of three types of acoustic waves.

FIG. 2 conceptually illustrates hypothetical waveforms 200-206 that may result from acoustic-wave excitation in a borehole by a single monopole acoustic source, as measured with seven receivers (e.g., receiver rings 109, or individual receivers 108 therein) placed at seven different longitudinal positions (i.e., distances from the source). The waveforms 200-206 are similar in their signatures, each including three distinct signals 210, 212, 214 of varying amplitudes, which correspond to the arrivals of the compressional wave, refracted shear wave, and Stoneley wave, respectively. Usually, as shown, the compressional wave arrives first, followed by the refracted shear wave, and then the Stoneley wave. Further, the arrival time (on an absolute scale) of each signal varies from receiver to receiver, due to the receivers' different distances from the source, which cause different time delays. From the time delays, evaluated across the various waveforms 200-206, but separately for each type of signal 210, 212, 214, the velocity of each type of wave (or the average velocity in the direction parallel to the sonic tool) may be inferred. Various semblance methods well-known in the art may be used to do so. One example of a suitable semblance method is the Differential Phase Time Semblance (DPTS) method described in Mukhopadhyay, P., et al., 2013, "The Differential-Phase Based Time- and Frequency-Semblance Algorithm for Array-Acoustic Processing and its Application to Formation-Slowness Measurements," Petrophysics, vol. 54, pp. 475-81.

Semblance methods generally involve "correlating," in a general sense, waveforms acquired by different receivers for a range of trial wave velocities or slownesses (the slowness s being the inverse of the velocity v along the tool or borehole axis, i.e., s=1/v) to compute a two-dimensional semblance map that reflects a measure of similarity between the waveforms as a function of time (or, in alternative embodiments, frequency) and the trial velocity or slowness. Peaks (i.e., local maxima) in this map correspond to the correct slownesses. Semblance methods may be coherence-, correlation-, or amplitude-based. In coherence-based methods (such as, e.g., the DPTS method), the measure of similarity between the waveforms (e.g., the coherence, in the strict mathematical sense) is independent of the waveform amplitudes, such that waveform features of varying amplitudes result, for the correct respective slownesses, in comparable coherence levels. Thus, coherence-based methods can generate numerous detections associated with waveforms, or features thereof, that are highly coherent, but not necessarily high in amplitude. Some of these detections may correspond to signals, while others may be due to random noise. Amplitude-based methods, by contrast, result in values of the semblance function that depend not only on the level of similarity between waveforms for a given time sample and slowness, but also on the waveform amplitudes. Thus, the random coherence of noise, although generally resulting in a peak in the semblance map, may be distinguishable from real signals based on a much lower peak amplitude, provided the noise levels in the waveforms are substantially below the signal levels.

Figure 3A:
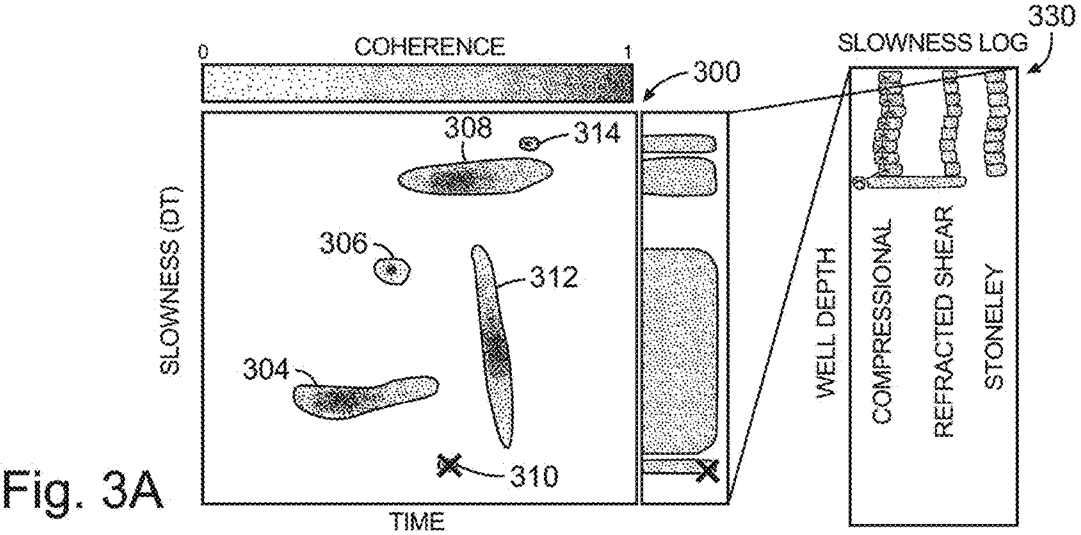
FIGS. 3A-3C are example time-slowness semblance maps as may be computed from waveforms as depicted in FIG. 2, in accordance with various embodiments.
Figure 3B:
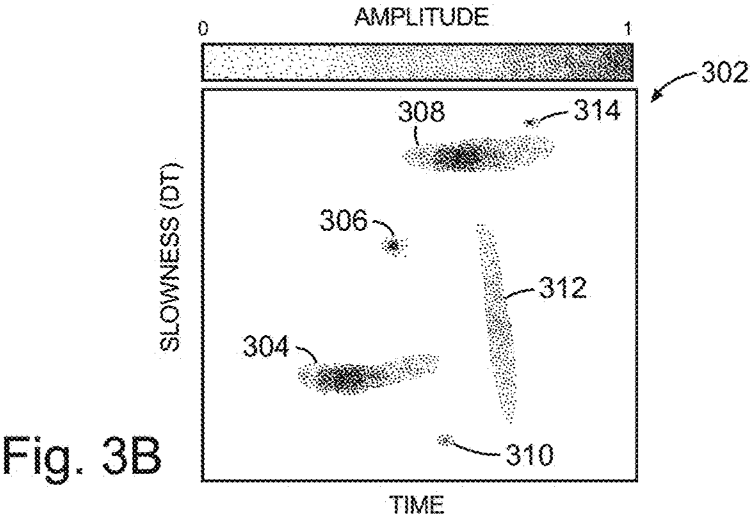
Figure 3C:
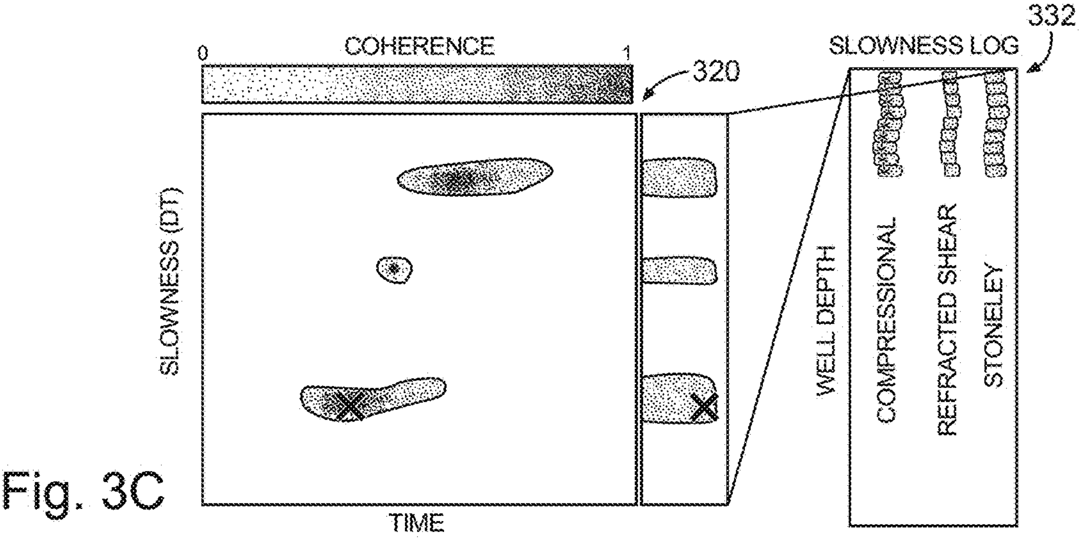

FIGS. 3A and 3B illustrate example time-slowness semblance maps 300, 302 (as may be computed, e.g., from the waveforms depicted in FIG. 2) that are coherence-based and amplitude-based, respectively. Both maps show three peaks 304, 306, 308 corresponding to the distinct signals 210, 212, 214 discernible in the waveforms of FIG. 2, i.e., the arrivals of the compressional wave, refracted shear wave, and Stoneley waves, respectively. In addition, both maps reflect random coherence of noise in peaks 310, 312, 314. In the coherence map 300, these peaks have coherence levels comparable to those of the signal peaks 304, 306, 308, entailing the potential for misidentification of noise peaks as signals. In the illustrated example, peak 310, which corresponds to the peak with the smallest slowness, will erroneously be identified as the compressional peak in many conventional peak-detection methods that, by default, pick the fastest peak, among all peaks in the semblance map above a certain detection threshold, as the compressional peak. In the amplitude map 302, by contrast, the noise peaks 310, 312, 314 have significantly lower amplitudes than the signal peaks 304, 306, 308, facilitating their rejection and ensuring the correct identification of the compressional peak. Note, however, that the semblance maps shown in FIGS. 3A and 3B are based on the assumption that the signals have comparable amplitudes in the measured waveforms. This is often not the case. The compressional-wave amplitude, for instance, is sometimes orders of magnitude smaller than the Stoneley-wave amplitude. In such cases, the compressional peak is likely to be missed in an amplitude-based detection. In various embodiments, this problem is addressed by "regularizing" the waveforms prior to computing an amplitude semblance map and using a theoretically derived signal-to-noise threshold, as described in more detail below. From the resulting amplitude semblance map, peaks due to real signals stand out above all other noise and can be robustly identified. Alternatively, the amplitude semblance map can be used in conjunction with a coherence semblance map to improve the performance of signal detection therein, for example, by rejecting peaks in the latter that do not have a corresponding high-amplitude peak in the former (such as, e.g., peaks 310). FIG. 3C illustrates a coherence semblance map 320 that results from filtering or processing, in this manner, of the coherence map 300 of FIG. 3A based on the amplitude semblance map 302 of FIG. 3B.

The velocity of the compressional, shear, and Stoneley waves, and thus the location of the compressional, shear, and Stoneley peaks 304, 306, 308 in the semblance map 300, may change from cycle to cycle due to varying formation properties at different depths. These changes can in principle be tracked and visualized with acoustic logs that aggregate the peak data over many cycles, resulting in velocity or slowness data as a function of depth for each of the tracked signals (i.e., for each type of acoustic wave measured). FIG. 3A conceptually illustrates an example log 330 including signal traces for compressional, refracted shear, and Stoneley waves, respectively. In the example shown, the compressional trace reflects the erroneous detection of the noise peak 310. FIG. 3C shows a similar log 332, which, however, correctly traces the compressional slowness due to the improved coherence semblance map 320.

Figure 4:
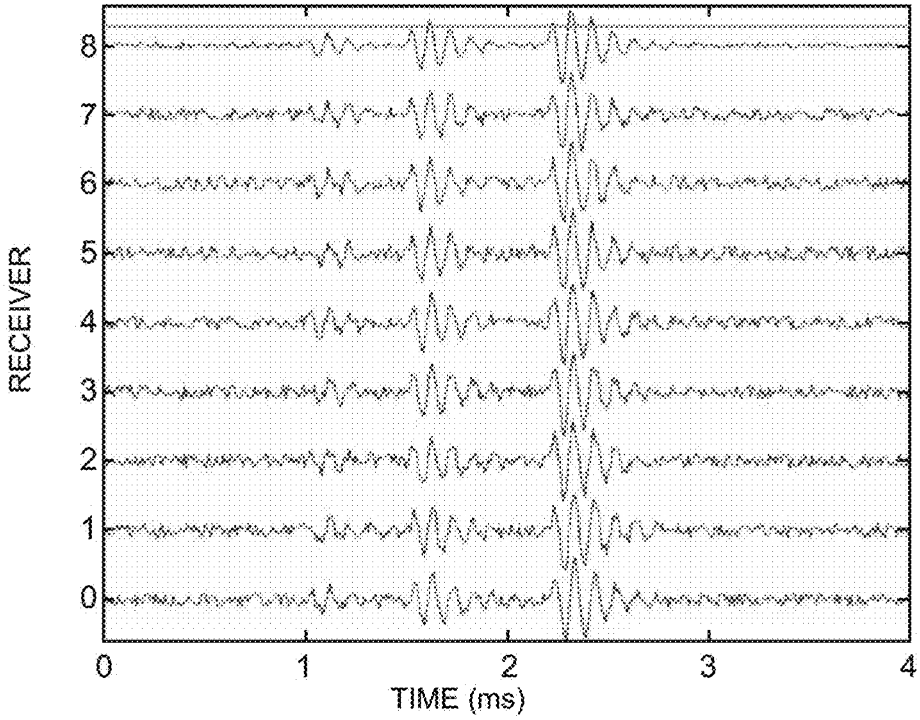
FIG. 4 is a graph of simulated acoustic waveforms with added noise for eight receivers, and their average (topmost waveform), in accordance with various embodiments, illustrating the effect of waveform averaging on the signal-to-noise ratio.

Improved peak detection using a combination of waveform regularization, averaging, and thresholding will now be described in more detail. Referring to FIG. 4, the effect of averaging over the waveforms detected with multiple receivers for a single acoustic excitation is illustrated. More specifically, FIG. 4 shows waveforms as they may result from an acoustic monopole firing, acquired with eight receivers (labeled 0 through 7). Each waveform includes three distinct signals corresponding to the compressional, refracted shear, and Stoneley arrivals, as well as significant background noise. The time delays for the different arrivals, from one receiver to the next, have been removed for presentation purposes. The waveform labeled "8" corresponds to the pointwise arithmetic average over the eight waveforms 0-7 (i.e., pointwise summation over the eight waveforms and division by 8). As can be seen, the noise level in the averaged waveform has been significantly reduced. This is a consequence of the well-known coherent averaging theory. If the energy is aligning in phase, then the energy will constructively interfere upon summation, increasing the amplitude of the coherent energy in the summation in dB by $20 \cdot \log 10(N)$, where N is the number of waveforms averaged. Conversely, incoherent energy is out of phase and will destructively interfere, increasing the amplitude of the incoherent energy by $10 \cdot \log 10(N)$. The resulting improvement in the signal-to-noise (SNR) ratio is $20 \cdot \log 10(N) - 10 \cdot \log 10(N) = 10 \cdot \log 10(N)$. For example, for eight receivers, the SNR gain would be 9 dB, which is equivalent to a reduction of the noise amplitude by a factor of ~3.

To separate signals from noise, an amplitude threshold may be applied to the averaged waveform or the magnitude of the Hilbert transform of the averaged waveform. In FIG. 4, this threshold is indicated by a straight line going through waveform 8. In this example, the threshold is a relative amplitude threshold set at 50% of the global maximum amplitude (provided by the third arrival, i.e., that of the Stoneley wave) of the averaged waveform. Peaks above the threshold are considered to correspond to real signals (such as wave arrivals), whereas all fluctuations below the threshold are regarded as noise. In this case, the second and third arrivals are detected, but the first arrival is missed. In some cases, the signal amplitude of the first arrival may be larger, or the signal amplitude of the third arrival may be lower, either of which may result in the detection of the first arrival. Of course, the detection threshold can be adjusted to a smaller value, e.g., 5% of the maximum amplitude, but at some point noisy data will start to give false alarms. Since both signal and noise levels can vary widely and unpredictably, it is difficult to specify a threshold that suits all data.

The approach described herein provides a method that reliably separates the incoherent energy from the coherent energy, regardless of the maximum signal amplitude, minimum signal amplitude, noise level, and number of detections. Such coherent energy separation is accomplished, in accordance with various embodiments, by performing a time-variable regularization of the waveforms. Waveform amplitude regularization may be implemented, for instance, in accordance with the following relation:

$$b_i = \frac{a_i}{\sqrt{\sum_{j=i-M/2}^{i+M/2} a_j^2}}$$

Figure 5:
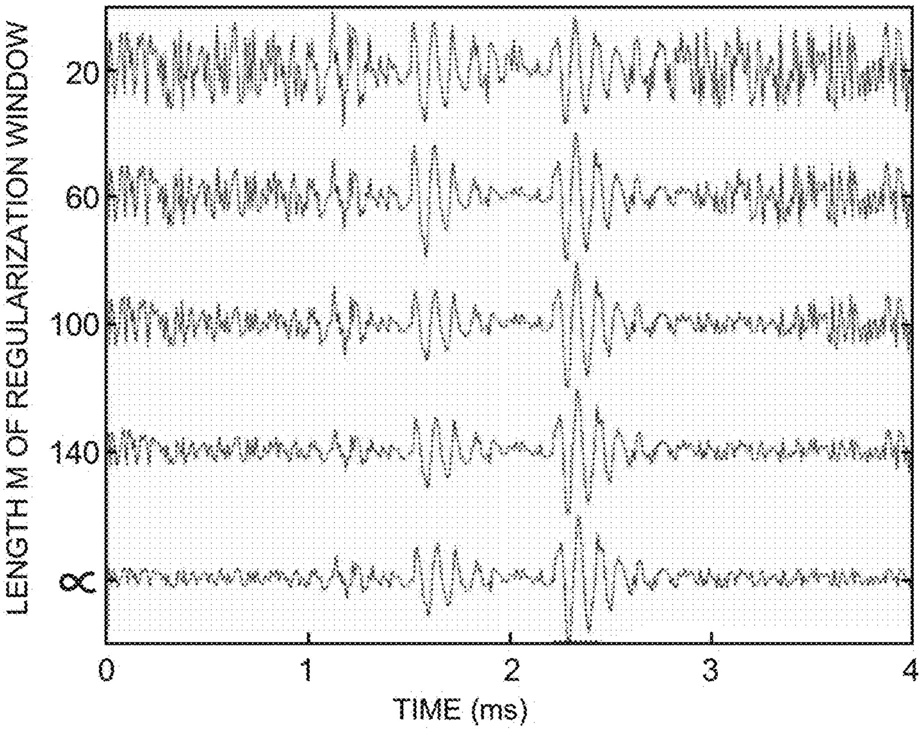
FIG. 5 is a graph of simulated acoustic waveforms generated by application of various levels of amplitude regularization in accordance with various embodiments.

Herein, $b_i$ is the new amplitude time series, $a_i$ is the original amplitude time series, i is the independent variable index, and j is the index across the local running time window of length M. The smaller the value of M, the more are amplitude variations in the waveform diminished. For example, in the extreme case where M=1, each signal point would be divided by itself, resulting in a completely flat waveform. Conversely, in the extreme case where M spans the entire time series, each point would be divided by the same number, resulting in no regularization at all. As will be readily appreciated by those of ordinary skill in the art, the regularization acts, in the case for a monochromatic signal with a slowly varying frequency, as a type of high-pass filter that reduces amplitude variations beginning at the longest time scales (i.e., lowest frequencies) and moving to shorter time scales (i.e., higher frequencies) as the length M of the window gets smaller and smaller. This is illustrated in FIG. 5, which shows waveform 0 of FIG. 4 along with regularizations thereof for different values of M.

By regularizing the waveforms, not only the various signal levels, but also the noise levels are equalized. To facilitate discrimination between signal and noise, the regularized waveforms are then averaged, in accordance with various embodiments. This averaging process is done for a series of trial propagation direction and apparent propagation speeds, amounting to an amplitude semblance or beamforming method. The semblance (or average) function S(t, v), where t denotes time and v denotes apparent velocity, can be computed from the regularized waveforms b according to:

$$S(t_i,v_j)=\text{abs}\{H\{1/N\Sigma_k^N w_k b(t_i-t_{jk}^*)\}\},$$

where i, j, and k are the indices corresponding to the times, velocities, and receivers, $b(t_i-t_{jk}^*)$ is, accordingly, the regularized waveform of receiver k, time shifted based on an apparent velocity $v_j$ and evaluated at time $t_i$, $w_k$ are weights associated with the receivers, H is the Hilbert transform, and abs{ } is the absolute value. Weighting of the waveforms is optional, i.e., in some embodiments, the weights are all set equal to 1, resulting in a simple (non-weighted) average. It should be noted that this semblance method is a point-to-point method, which yields greater temporal resolution of slowness peaks than traditional window-based methods. However, window-based semblance methods may also be used. Averaging results in a reduction of the amplitude of the incoherent noise relative to the amplitude of the coherent signals by a factor of $1/\sqrt{N}$, where N is the number of waveforms being averaged.

Figure 6:
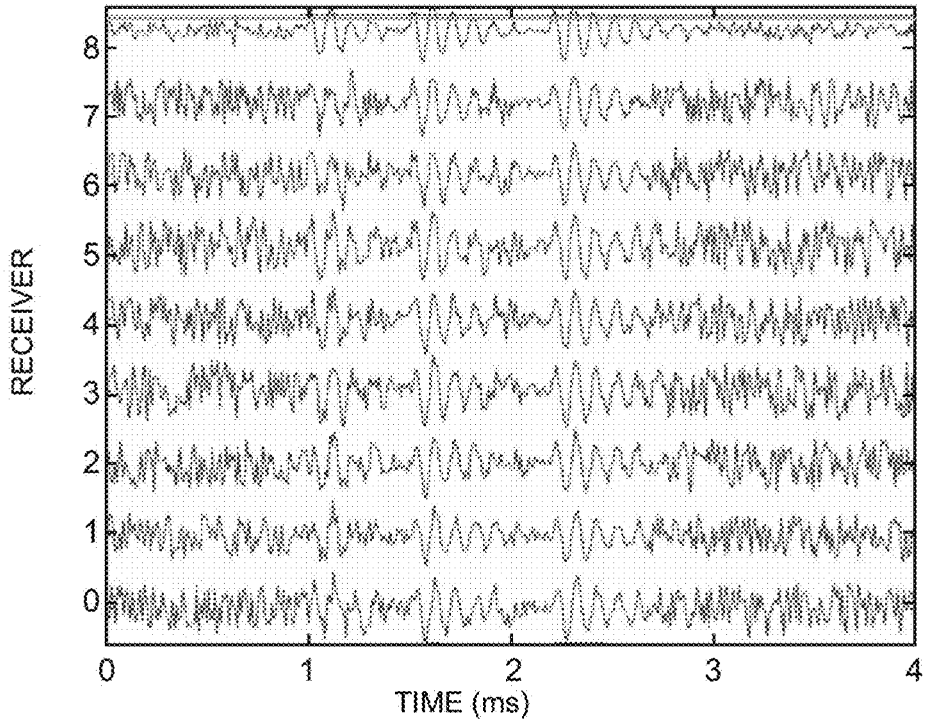
FIG. 6 is a graph of the measured acoustic waveforms of FIG. 4 following amplitude regularization thereof, also showing an average over the regularized waveforms in accordance with various embodiments.

FIG. 6 is a graph of the measured acoustic waveforms of FIG. 4 following amplitude regularization thereof in accordance with the above equation, also showing an average over the regularized waveforms in accordance with various embodiments. Note that the signal amplitudes in the averages are now all at the same amplitude level, but the noise level is reduced to about 30% of the maximum signal level as predicted for $1/\sqrt{8}$. Accordingly, a detection threshold set at 50% of the maximum amplitude now clearly separates all three coherent signals (even though they originate from variable amplitudes and different noise levels) from the incoherent noise.

Figure 7:
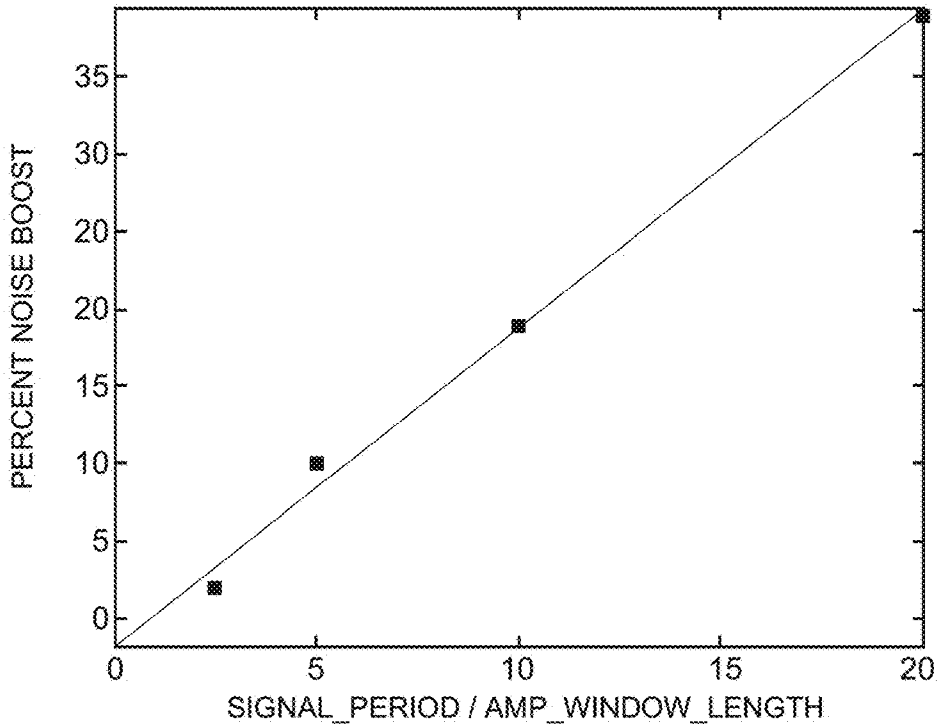
FIG. 7 is a graph of the noise boost resulting from amplitude regularization in accordance with various embodiments, as a function of the ratio of the signal period to the regularization window length.

This coherent energy separation (CES), i.e., waveform regularization followed by averaging and thresholding, e.g., as described above, is useful for separating false alarms from events of interest. In various embodiments, the window length M of the amplitude regularization is selected based on the predominant signal frequencies, which are predictable from the amplitude spectrum of the excitation waveform. This window length controls the amplification of low-frequency energy relative to the amplification of the high-frequency energy. For waveforms with signals having a predominant low center frequency, regularization with a value of M that is too small will amplify high-frequency noise that is imprinted on top of the lower frequency signals. A series of numerical tests were performed to quantify this effect. Four different synthetic waveforms with different center frequencies were assumed for a fixed time-window length. FIG. 7 shows the resulting measurements in the form of a graph of the noise boost resulting from amplitude regularization as a function of the ratio of the center signal period (the inverse of the center frequency) to the regularization window length. The following best-fit line predicts the values well:

$$\text{percent noise boost} = \frac{2}{\tau f_c} - 1.7$$

where τ is the amplitude window length and $f_c$ is the predominant central frequency. For example, for a signal frequency of 500 Hz and a window length of 0.25 ms, the noise would be increased by a factor of 14%. For a signal frequency of 1 kHz with the same window length, the noise increase reduces to 6%. These noise increases are reduced by the averaging process. Therefore, only for very low frequencies below 200 Hz does one increase noise significantly in the final average.

Figure 8:
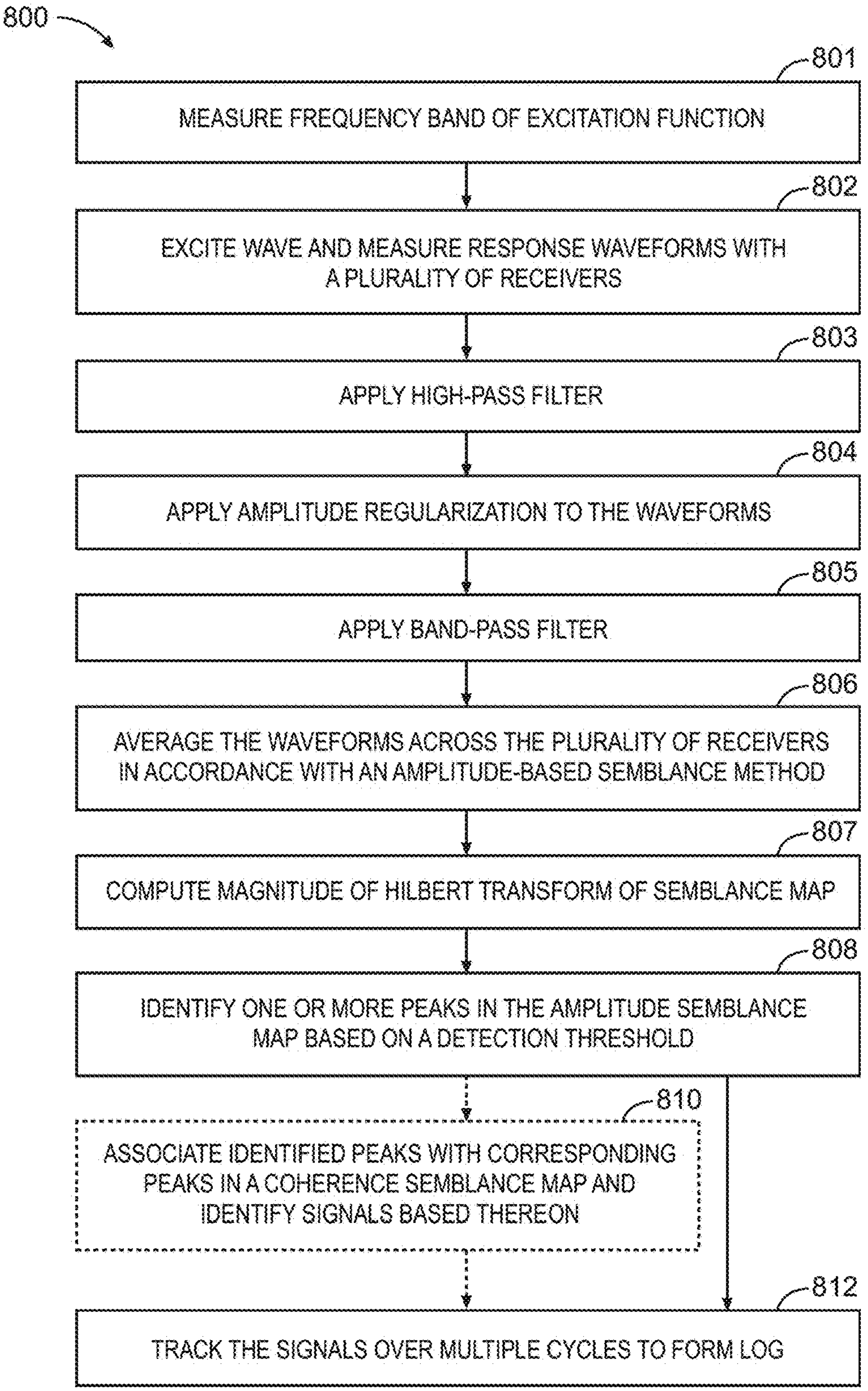
FIG. 8 is a flowchart illustrating a method in accordance with various embodiments.

FIG. 8 illustrates, in the form of a flowchart, a method of applying the above-described approach in the context of generating signal logs (e.g., acoustic logs). The method 800 involves measuring the frequency band of an excitation function to determine the high and low cut-off frequencies of the excitation band (action 801). Further, it includes exciting a wave in the borehole in accordance with the excitation function, and measuring the response waveforms resulting from the excitation with multiple receivers (action 802). The waves may be, e.g., acoustic waves excited and measured with a sonic logging tool 100 as described with respect to FIG. 1A. Further, the method 800 involves processing the waveforms by applying a high-pass filter with a cut-off frequency corresponding to the low cut-off frequency of the excitation band to remove low-frequency noise (e.g., such as "road noise" commonly found in borehole acoustic data) (action 803), applying amplitude regularization (action 804), and further applying a band-pass filter with high and low cut-off frequencies corresponding to those of the measured excitation bandwidth to further improve the signal-to-noise ratio (action 805). The amplitude regularization may be frequency-dependent, the regularization window may be selected based on the predominant signal frequencies (e.g., as represented by the center frequency) of the excitation function or the acquired waveforms. The method 800 further includes averaging the waveforms across the plurality of receivers in accordance with an amplitude-based semblance method (action 806), computing the absolute value of the Hilbert transform of the averaged waveforms to obtain the envelope (action 807), and identifying one or, typically, multiple peaks in the resulting amplitude semblance map (action 808) based on a suitable detection threshold (specified, e.g., in terms of a fraction of the maximum amplitude or as an absolute threshold). Optionally, the identified peaks may be associated with corresponding peaks in a coherence semblance map computed from the same waveforms to assist in the accurate identification of signal peaks (810). The detected signals (whether determined directly from the amplitude semblance map or, alternatively, from the improved coherence semblance map) may be collected over multiple cycles of wave excitation and measurement (e.g., multiple operational cycles of an acoustic logging tool) to form a log tracking the signal (action 812).

The processing actions 804-812 may be implemented with suitable circuitry, such as circuitry integrated into the logging tool 100 or provided as part of a separate facility in communication therewith (such as surface computational facility 114 or 136). (Unless otherwise indicated or apparent from context, the term "computational facility" herein encompasses all circuitry implementing the computational functionality described herein, whether integrated into the logging tool or provided separately.) The term "circuitry" is intended to include both dedicated, special-purpose hardware, as well as general-purpose hardware suitably programmed to achieve the functionality described herein. In various embodiments, the circuitry includes one or more special-purpose or general-purpose processors (e.g., a central processing unit (CPU), digital signal processor (DSP), field-programmable gate array (FPGA) or other), which may be configured, by virtue of suitable programming, to provide the computational functionality described herein.

Figure 9:
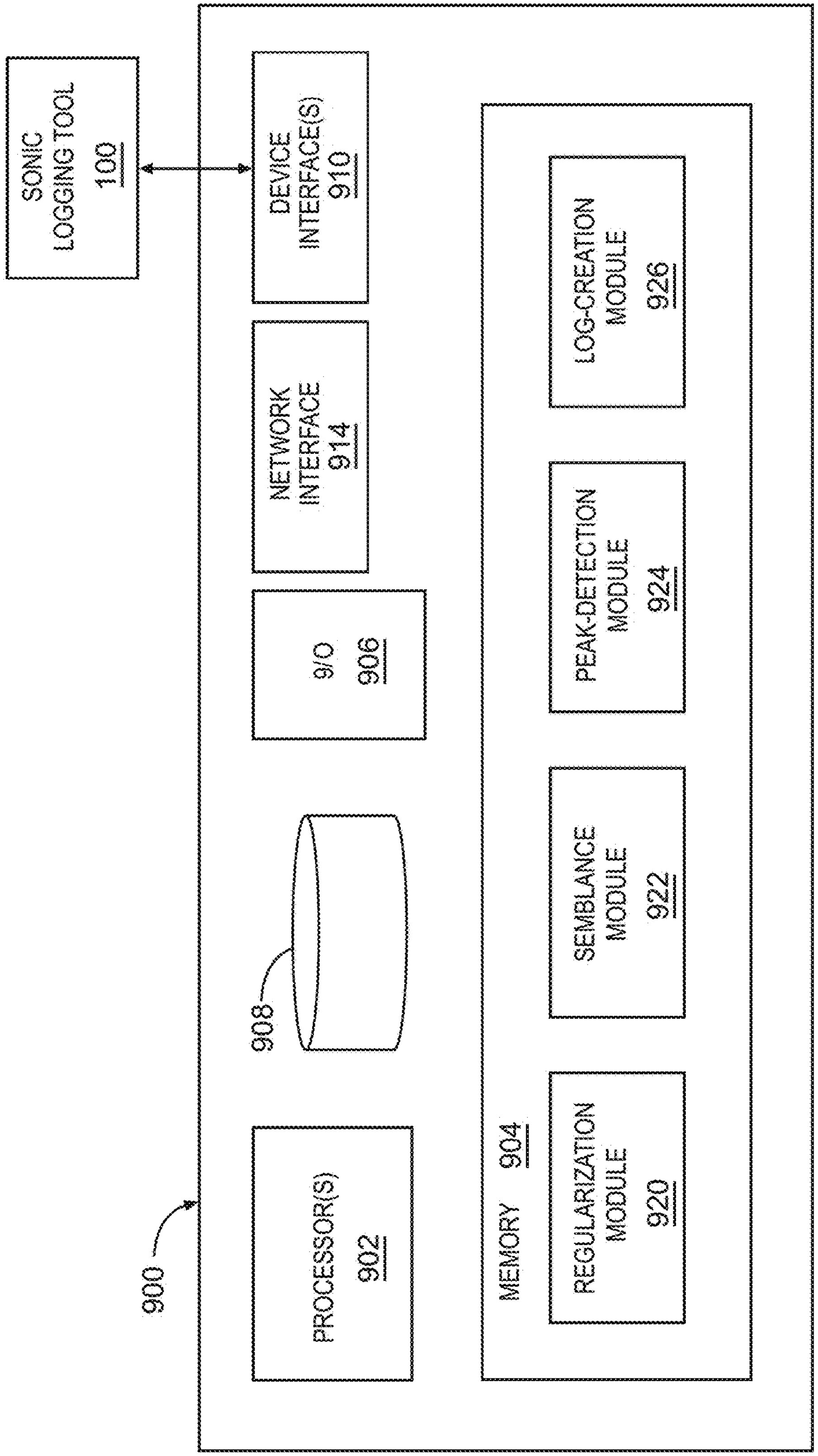
FIG. 9 is a block diagram of an example processing facility for implementing the computational functionality of the method of FIG. 8, in accordance with various embodiments.

FIG. 9 is a block diagram of an example computational facility, in the form of a suitably programmed general-purposes computer, for implementing the computational functionality of the method of FIG. 8. The computational facility 900 includes one or more processors 902 (e.g., a conventional central processing unit (CPU), graphical processing unit, or other) configured to execute software programs stored in memory 904 (which may be, e.g., random-access memory (RAM), read-only memory (ROM), flash memory, etc.). Further, the computational facility 900 may (but need not) include user input/output devices 906 (e.g., a screen, keyboard, mouse, etc.), permanent data-storage devices 908 (including, e.g., solid-state, optical, and/or magnetic machine-readable media such as hard disks, CD-ROMs, DVD-ROMs, etc.), device interfaces 910 for communicating directly or indirectly with the sonic logging tool 100, a network interface 914 that facilitates communication with other computer systems and/or data repositories, and a system bus (not shown) through which the other components communicate. While shown as a single unit, the computational facility 900 may also be distributed over multiple machines. For example, the computational facility 900 may be implemented "in the cloud," distributed over multiple remote cloud-computing resources (such as multiple processors 902 within separate servers) connected via a network to each other and/or to a surface logging facility or directly the logging tool.

The software programs stored in the memory 904 include processor-executable instructions for performing the methods described herein, and may be implemented in any of various programming languages, for example and without limitation, C, C++, Object C, Pascal, Basic, Fortran, Matlab, and Python. The instructions may be grouped in various functional modules, e.g., for the purpose of re-use and sharing of the functionality of certain modules between other modules that utilize it. In accordance with the depicted embodiment, the modules include, for instance, a regularization module 920 that implements amplitude regularization of the measured waveforms; a semblance module 922 for the computation of (amplitude and/or coherence) semblance maps from acoustic waveforms; a peak-detection module 624 for thresholding the amplitude maps to identify peaks, and optionally to identify peaks in coherence semblance maps and associate them with the peaks in the amplitude semblance maps; and a log-creation module 626 for assembling the individual peaks into logs of the peak velocity or slowness as a function of depth (e.g., for compressional, refracted-shear, and Stoneley waves). Of course, the depicted organization into modules is merely one non-limiting example of ways in which instructions that implement the disclosed functionality can be grouped. Further, the instructions implementing the methods described herein may generally be stored on any machine-readable medium (e.g., on a non-volatile medium from which they may be loaded into memory prior to execution by one or more processors).

To demonstrate the usefulness of coherent energy separation as described above (hereinafter "CES"), the method was used, in accordance with various embodiments, in conjunction with the coherence-based DPTS method. The waveforms were amplitude-regularized. The coherence semblance map as a function of time and slowness was calculated, as was an amplitude semblance map. (Note that the coherence function is not modified significantly by the amplitude regularization, since coherence is a different measure than amplitude.) An event detector was then used to identify clusters of high-coherence values in the two-dimensional coherence map defining possible detections. The semblance amplitudes associated with the detections were evaluated; if they were greater than 50% of the global maximum amplitude, then the detection was deemed valid. This method is robust in that one does not need to be strict about the number of detections permitted in the final detections bulletin. In other words, if physics predicts only three different arrivals, and if one permits, for instance, eight final detections, one may get eight detections that are all clustering around the three different physically possible arrivals (rather than three at those arrivals and five around spurious noise sources).

Figure 10A:
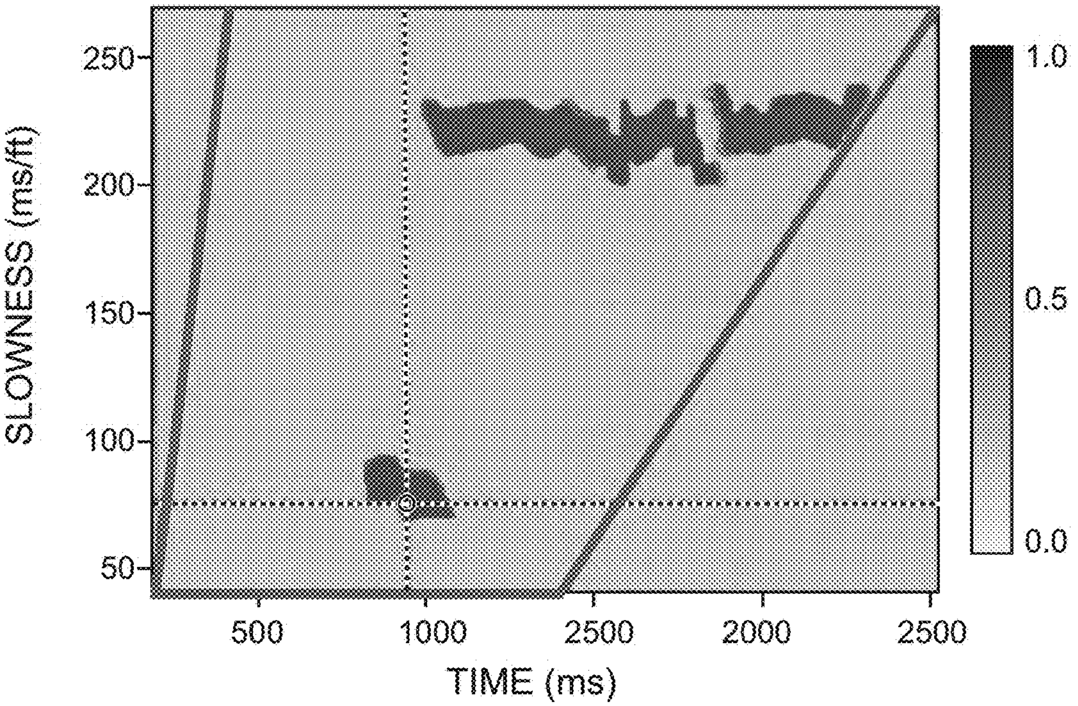
FIGS. 10A and 10B show semblance maps computed for a specified depth within a well without and with coherent energy separation in accordance with various embodiments, respectively.
Figure 10B:
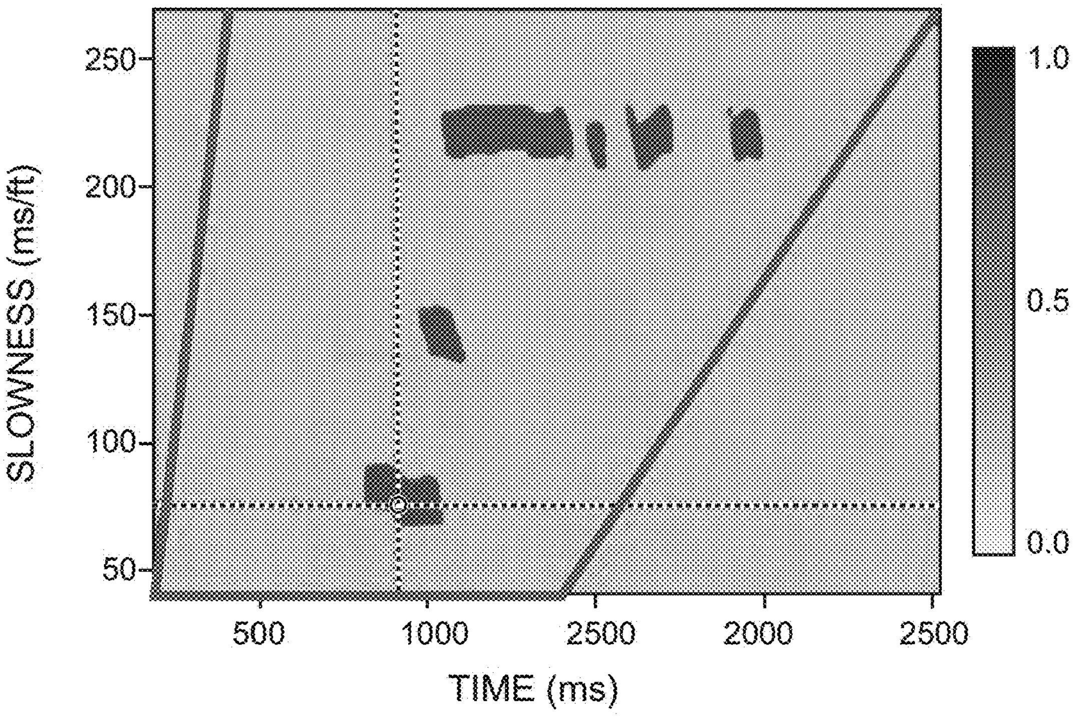

FIGS. 10A and 10B show semblance maps at a specific depth in a well with and without CES. At each depth, the DPTS algorithm is performed with the intent of detecting the refracted compressional, refracted shear, and Stoneley waves in order of increasing slowness from 30 to 270 □/ft. The DPTS method alone does not detect the refracted shear slowness of about 145 □/ft. However, using DPTS with CES separates the coherent energy from the incoherent energy, permitting easy detection of all coherent arrivals.

Figure 11A:
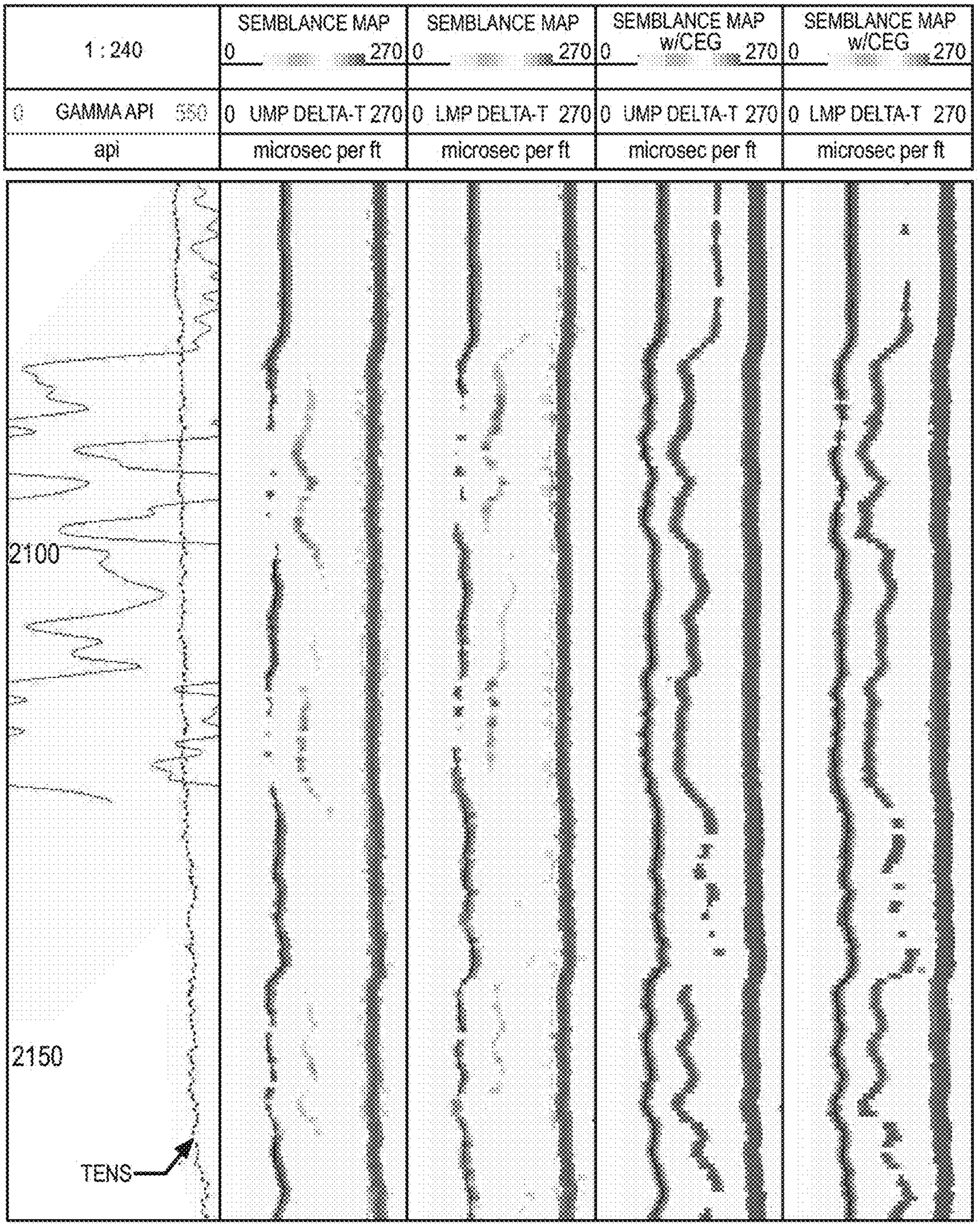
FIGS. 11A and 11B are acoustic logs generated for different sections of a well from semblance maps such as those depicted in FIGS. 10A and 10B, both with (right two logs) and without (left two logs) coherent energy separation in accordance with various embodiments.
Figure 11B:
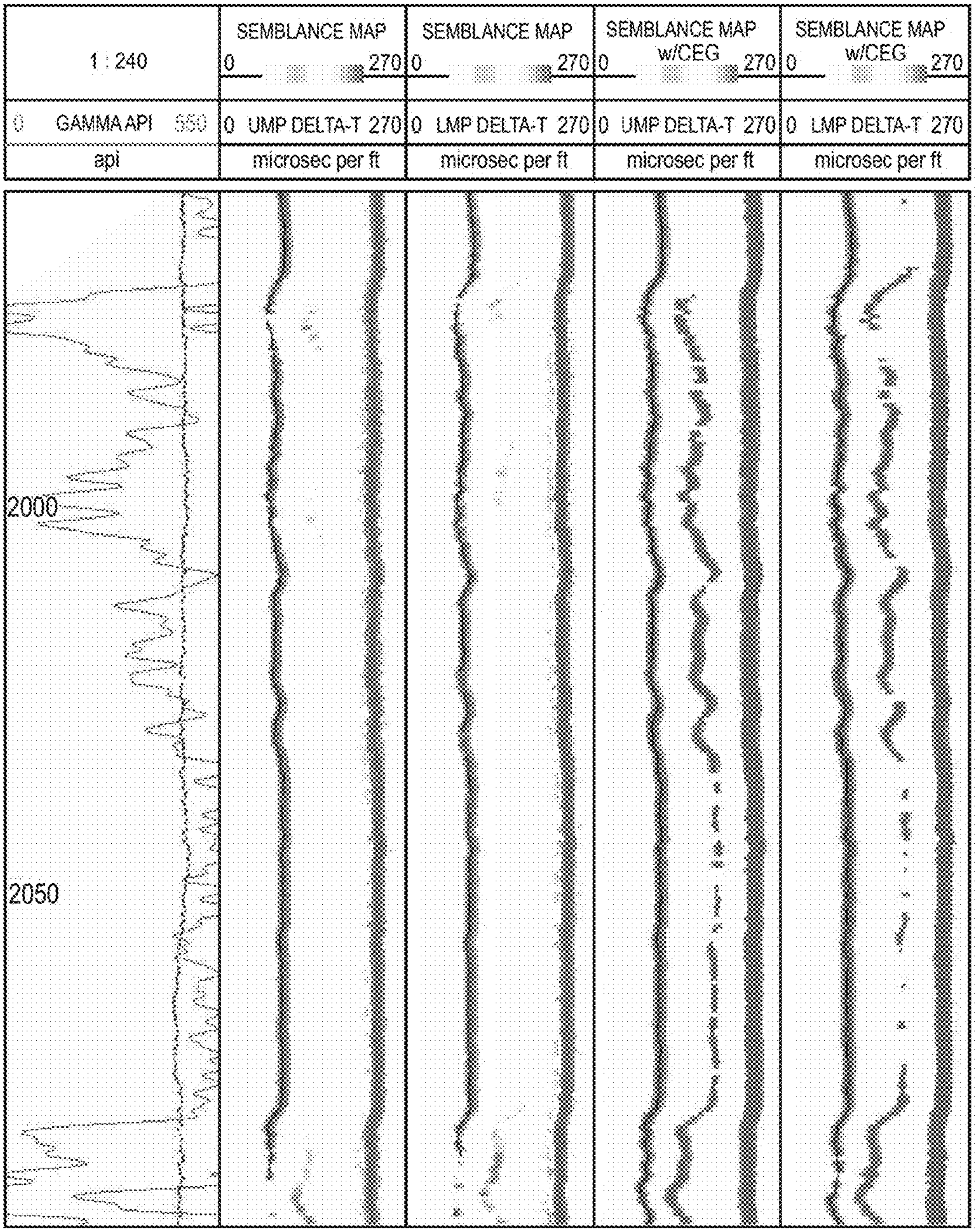

FIG. 11A shows the application of CES for the entire well. Two different source-receiver geometries are analyzed (referred to as Upper Monopole—UMP and Lower Monopole—LMP). Both geometries should see refracted compressional, refracted shear, and Stoneley arrivals. The refracted compressional arrival energy is always the fastest (i.e., comes in at the smallest slowness around 80 microseconds per foot) and is traced with a black curve for all depths where it is detected. Without CES (left two logs), there are gaps in the compressional arrival at certain depths. With CES (right two logs), 100% detection is achieved and the log becomes continuous. This is one benefit of the method. FIG. 11B shows another section of the well where the refracted shear arrival is not detected without CES (left two logs). However, an ~85% detection improvement is achieved by using CES (right two logs).

The following numbered examples are illustrative embodiments.

1. A method comprising: exciting a wave in a medium and acquiring signal waveforms resulting from the excitation at a plurality of locations; processing the signal waveforms acquired at the plurality of locations, the processing comprising applying amplitude regularization to each of the waveforms to decrease amplitude variations between signal and noise components, averaging the waveforms across the plurality of locations in accordance with an amplitude-based semblance method to obtain a two-dimensional amplitude semblance map, and identifying one or more signal peaks in the two-dimensional amplitude semblance map based on a specified threshold.

2. The method of example 1, wherein the waves are acoustic waves excited by a monopole source of a sonic logging tool deployed within a borehole, and the signal waveforms resulting from the excitation are acoustic waveforms and are acquired with a plurality of receivers of the sonic logging tool.

3. The method of example 2, wherein the one or more signal peaks correspond to acoustic-wave arrivals comprising at least one of a compressional-wave arrival, a refracted shear-wave arrival, or a Stoneley arrival.

4. The method of any of the preceding examples, further comprising measuring a frequency band of an excitation function according to which the wave is excited, and applying a high-pass filter that is based on the measured frequency band to the signal waveforms prior to applying amplitude regularization.

5. The method of example 4, further comprising applying a band-pass filter that is based on the measured frequency band to the regularized waveforms prior to averaging the waveforms.

6. The method of any of the preceding examples, further comprising computing a magnitude of a Hilbert transform of the amplitude semblance map prior to identifying the one or more signal peaks.

7. The method of any of the preceding examples, further comprising associating the one or more signal peaks identified in the amplitude semblance map with one or more signal peaks identified in a two-dimensional coherence semblance map computed from the signal waveforms.

8. The method of any of the preceding examples, wherein a length of a regularization window used in the amplitude regularization is selected based on at least one of a frequency of an excitation function according to which the wave is excited or a frequency of the acquired signal waveforms.

9. The method of any of the preceding examples, wherein the threshold is based on coherent averaging theory and a number of signal waveforms averaged in accordance with the amplitude-based semblance method.

10. The method of any of the preceding examples, wherein the threshold is a fixed relative threshold specified as a fraction of a global maximum of the amplitude semblance map.

11. The method of any of the preceding examples, wherein the threshold is selected to robustly separate coherent signals above the threshold from incoherent noise below the threshold.

12. The method of any of the preceding examples, wherein averaging the waveforms comprises computing one of a simple average or a weighted average.

13. The method of any of the preceding examples, wherein the amplitude-based semblance method is a point-to-point method.

14. A computational facility for processing signal waveforms resulting from a wave excited in a medium, the signal waveforms being acquired at a plurality of locations, the computational facility comprising circuitry configured to: apply amplitude regularization to each of the waveforms to decrease amplitude variations between signal and noise components; average the waveforms across the plurality of locations in accordance with an amplitude-based semblance method to obtain a two-dimensional amplitude semblance map; and identify one or more signal peaks in the two-dimensional amplitude semblance map based on a specified threshold.

15. The computational facility of example 14, wherein the circuitry is further configured to apply a high-pass filter to the signal waveforms prior to applying amplitude regularization, the high-pass filter being based on a measured frequency band of an excitation function according to which the wave was excited.

16. The computational facility of example 15, wherein the circuitry is further configured to apply a band-pass filter to the regularized waveforms prior to averaging the waveforms, the band-pass filter being based on the measured frequency band.

17. The computational facility of any of examples 14-16, wherein the circuitry is further configured to compute a magnitude of a Hilbert transform of the amplitude semblance map prior to identifying the one or more signal peaks.

18. The computational facility of any of examples 14-17, wherein the circuitry is further configured to associate the one or more signal peaks identified in the amplitude semblance map with one or more signal peaks identified in a two-dimensional coherence semblance map computed from the signal waveforms.

19. A sonic logging system comprising: a sonic logging tool, for disposal in a borehole, comprising a monopole acoustic source and a plurality of receivers; and a processing facility configured to process acoustic waveforms acquired at the plurality of receivers resulting from an acoustic wave excited by the monopole acoustic source by applying amplitude regularization to each of the waveforms, averaging the waveforms across the plurality receivers in accordance with a semblance method to obtain a two-dimensional semblance map, and identifying one or more signal peaks in the two-dimensional semblance map based on a specified threshold.

20. The system of example 19, wherein the processing facility is integrated in the sonic logging tool.

21. The system of example 19, wherein the processing facility is located above surface and communicatively coupled to the sonic logging tool.

Many variations may be made in the systems, tools, and methods described and illustrated herein without departing from the scope of the inventive subject matter. Accordingly, the specific embodiments and examples described are intended to be illustrative and not limiting.

What is claimed is:

1. A method comprising:

exciting a wave in a medium and acquiring signal waveforms resulting from the excitation at a plurality of locations;

processing the signal waveforms acquired at the plurality of locations, the processing comprising:

applying amplitude regularization to each of the waveforms to decrease amplitude variations between signal and noise components;

averaging the waveforms across the plurality of locations in accordance with an amplitude-based semblance method to obtain a two-dimensional amplitude semblance map;

identifying one or more signal peaks in the two-dimensional amplitude semblance map based on a specified threshold; and associating the one or more signal peaks identified in the amplitude semblance map with one or more signal peaks identified in a two-dimensional coherence semblance map computed from the signal waveforms.

2. The method of claim 1, wherein the waves are acoustic waves excited by a monopole source of a sonic logging tool deployed within a borehole, and the signal waveforms resulting from the excitation are acoustic waveforms and are acquired with a plurality of receivers of the sonic logging tool.

3. The method of claim 2, wherein the one or more signal peaks correspond to acoustic-wave arrivals comprising at least one of a compressional-wave arrival, a refracted shear-wave arrival, or a Stoneley arrival.

4. The method of claim 1, further comprising measuring a frequency band of an excitation function according to which the wave is excited, and applying a high-pass filter that is based on the measured frequency band to the signal waveforms prior to applying amplitude regularization.

5. The method of claim 4, further comprising applying a band-pass filter that is based on the measured frequency band to the regularized waveforms prior to averaging the waveforms.

6. The method of claim 1, further comprising computing a magnitude of a Hilbert transform of the amplitude semblance map prior to identifying the one or more signal peaks.

7. The method of claim 1, wherein a length of a regularization window used in the amplitude regularization is selected based on at least one of a frequency of an excitation function according to which the wave is excited or a frequency of the acquired signal waveforms.

8. The method of claim 1, wherein the threshold is based on coherent averaging theory and a number of signal waveforms averaged in accordance with the amplitude-based semblance method.

9. The method of claim 1, wherein the threshold is a fixed relative threshold specified as a fraction of a global maximum of the amplitude semblance map.

10. The method of claim 1, wherein the threshold is selected to robustly separate coherent signals above the threshold from incoherent noise below the threshold.

11. The method of claim 1, wherein averaging the waveforms comprises computing one of a simple average or a weighted average.

12. The method of claim 1, wherein the amplitude-based semblance method is a point-to-point method.

13. A computational facility for processing signal waveforms resulting from a wave excited in a medium, the signal waveforms being acquired at a plurality of locations, the computational facility comprising circuitry configured to:

apply amplitude regularization to each of the waveforms to decrease amplitude variations between signal and noise components;

average the waveforms across the plurality of locations in accordance with an amplitude-based semblance method to obtain a two-dimensional amplitude semblance map;

identify one or more signal peaks in the two-dimensional amplitude semblance map based on a specified threshold; and associate the one or more signal peaks identified in the amplitude semblance map with one or more signal peaks identified in a two-dimensional coherence semblance map computed from the signal waveforms.

14. The computational facility of claim 13, wherein the circuitry is further configured to apply a high-pass filter to the signal waveforms prior to applying amplitude regularization, the high-pass filter being based on a measured frequency band of an excitation function according to which the wave was excited.

15. The computational facility of claim 14, wherein the circuitry is further configured to apply a band-pass filter to the regularized waveforms prior to averaging the waveforms, the band-pass filter being based on the measured frequency band.

16. The computational facility of claim 13, wherein the circuitry is further configured to compute a magnitude of a Hilbert transform of the amplitude semblance map prior to identifying the one or more signal peaks.

17. A sonic logging system comprising:

a sonic logging tool, for disposal in a borehole, comprising a monopole acoustic source and a plurality of receivers; and a processing facility configured to process acoustic waveforms acquired at the plurality of receivers resulting from an acoustic wave excited by the monopole acoustic source by:

applying amplitude regularization to each of the waveforms;

averaging the waveforms across the plurality receivers in accordance with a semblance method to obtain a two-dimensional semblance map;

identifying one or more signal peaks in the two-dimensional semblance map based on a specified threshold; and associating the one or more signal peaks identified in the amplitude semblance map with one or more signal peaks identified in a two-dimensional coherence semblance map computed from the signal waveforms.

18. The system of claim 17, wherein the processing facility is integrated in the sonic logging tool.

19. The system of claim 17, wherein the processing facility is located above surface and communicatively coupled to the sonic logging tool.

* * * * *